United States Patent
Vall-Llosera et al.

(10) Patent No.: US 9,577,748 B2
(45) Date of Patent: Feb. 21, 2017

(54) MONITORING OF A PASSIVE OPTICAL NETWORK (PON)

(75) Inventors: Gemma Vall-Llosera, Järfälla (SE); Fabio Bottoni, Rome (IT); Stefan Höst, Svedala (SE); Neiva Lindqvist, Järfälla (SE); Patryk Urban, Vällingby (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/398,923

(22) PCT Filed: May 7, 2012

(86) PCT No.: PCT/SE2012/050481
§ 371 (c)(1),
(2), (4) Date: Nov. 4, 2014

(87) PCT Pub. No.: WO2013/169150
PCT Pub. Date: Nov. 14, 2013

(65) Prior Publication Data
US 2015/0139637 A1    May 21, 2015

(51) Int. Cl.
*H04B 10/08* (2006.01)
*H04B 10/079* (2013.01)
(Continued)

(52) U.S. Cl.
CPC ...... *H04B 10/0791* (2013.01); *G01M 11/3172* (2013.01); *H04B 10/071* (2013.01); *H04B 10/27* (2013.01)

(58) Field of Classification Search
CPC . H04B 10/071; H04B 10/0791; H04B 10/073; H04B 10/075; H04B 10/0793; H04B 10/0795; H04B 10/0775
(Continued)

(56) References Cited

U.S. PATENT DOCUMENTS 8,693,866 B1 *  4/2014  Lam ............ H04B 10/071
                                                    398/13
2003/0007215 A1 *  1/2003  Snawerdt ......... H04B 10/071
                                                    398/139
(Continued)

FOREIGN PATENT DOCUMENTS

EP      2 421 179 A1    2/2012
WO   WO/2011/104319 A1    9/2011

OTHER PUBLICATIONS

International Search Report for International Application No. PCT/SE2012/050481 mailed Feb. 1, 2013, 5 pages.
(Continued)

*Primary Examiner* — Hanh Phan
(74) *Attorney, Agent, or Firm* — Patents on Demand P.A.; Brian K. Buchheit; Scott M. Garrett

(57) ABSTRACT

A Passive Optical Network, PON, comprising an Optical Line Termination, OLT, connected to one or more Optical Network Terminals, ONT, over an Optical Distribution Network, ODN, is monitored by a monitoring device. The monitoring device comprises an Optical Frequency Domain Reflectometer, OFDR, and is arranged to monitor the optical power received by the OLT and the ONTs of the PON, and to perform transceiver analysis of the OLT and the ONTs, combined with an OFDR analysis of the ODN, based on the monitored optical power violating a threshold.

15 Claims, 6 Drawing Sheets

(51) Int. Cl.
*H04B 10/071* (2013.01)
*G01M 11/00* (2006.01)
*H04B 10/27* (2013.01)

(58) Field of Classification Search
USPC ........ 398/16, 14, 10, 13, 17, 20, 21, 23, 24, 25,398/33, 38, 66, 67, 68, 69, 70, 71, 72, 135, 136,398/137, 138, 139; 356/73.1, 477
See application file for complete search history.

(56) References Cited

U.S. PATENT DOCUMENTS

| | | | |
|---|---|---|---|
| 2009/0092388 A1 | 4/2009 | Yang | |
| 2009/0103100 A1* | 4/2009 | Froggatt | G01M 11/3172 356/477 |
| 2011/0141457 A1* | 6/2011 | Levin | G01M 11/3127 356/73.1 |
| 2011/0274426 A1 | 11/2011 | Yang | |
| 2014/0016926 A1* | 1/2014 | Soto | H04B 10/0775 398/16 |

OTHER PUBLICATIONS

Written Opinion of the International Searching Authority for International Application No. PCT/SE2012/050481 mailed Feb. 1, 2013, 5 pages.

Yuksel et al: "Novel Monitoring Technique for Passive Optical Networks Based on Optical Frequency Domain Reflectometry and Fiber Bragg Gratings" J. Opt. Commun. Netw., Jul. 1, 2010, vol. 2, No. 7, pp. 463-468.

ITU-T Recommendation G.984.2 (Mar. 2003); Series G: Transmission Systems and Media, Digital Systems and Networks; Digital sections and digital line system—Optical line systems for local and access networks; Gigabit-capable Passive Optical Networks (GPON): Physical Media Dependent (PMD) layer specification; International Telecommunication Union; 38 pages.

Urban et al: "WDM-PON Fiber-Fault Automatic Detection and Localization with 1dB Event Sensitivity in Drop Links" Optical Fiber Communication Conference and Exposition (OF C/NFOEC), 2012 and the National Fiber Optic Engineers Conference (NFOEC); IEEE, Los Angeles, CA, Mar. 4-8, 2012; 3 pages.

\* cited by examiner

MONITORING OF A PASSIVE OPTICAL NETWORK (PON)

CROSS REFERENCE TO RELATED APPLICATION

This application is a 35 U.S.C. §371 national stage application of PCT International Application No. PCT/SE2012/050481, filed on 7 May 2012, the disclosure and content of which is incorporated by reference herein in its entirety. The above-referenced PCT International Application was published in the English language as International Publication No. WO 2013/169150 A1 on 14 Nov. 2013.

TECHNICAL FIELD

This disclosure relates to a method of monitoring a Passive Optical Network, PON, wherein the PON comprises an Optical Line Termination, OLT, connected to one or more Optical Network Terminals, ONTs, over an Optical Distribution Network, ODN. The disclosure also relates to a monitoring device for a PON, to a computer program causing a monitoring device to perform the method of monitoring of a PON, and to a computer program product comprising the computer program stored on a computer readable medium.

BACKGROUND

A broadband access may be implemented by a passive fiber optical access network, e.g. by a B-PON (Broadband Passive Optical Network or a G-PON (Gigabit-capable Passive Optical Network). A passive optical network comprises an OLT (Optical Line Terminal) and one or more ONTs (Optical Network Terminations) and/or ONUs (Optical Network Units) connected by an ODN (Optical Distribution Network), which includes optical fibers and passive optical power splitters, since a PON does not require active electrical components for splitting the optical signals.

The OLT is located at a Central Office, CO, associated with a service provider (e.g. an operator), and the CO provides an interface for delivery of services, e.g. telephony, Ethernet data or video, to subscribers/end-users over the PON. Each ONT/ONU terminates the PON and converts the optical signals into electrical signals for delivery of the services to terminals of the subscribers/end-users, via a suitable user interface.

Typically, a single optical fiber of the PON carries the traffic from the OLT to a Remote Node, RN, in which the traffic signal may be split by passive optical splitters into a number of separate optical fibers (drop links), each one being terminated by an ONU or an ONT, in an optical point-to-multipoint link. However, the traffic signal from the OLT could also be connected to only one ONT/ONU in a point-to-point link.

A so-called high-loss budget PON may involve an OLT that is connected to a comparatively large number of ONTs/ONUs via a point-to-multipoint link, which comprises a Remote Node with a high split ratio, typically larger than 1:32.

The above-mentioned terms ONU and ONT both indicate a device that terminates any one of the distributed (leaf) endpoints of an ODN, implements a PON protocol, and adapts PON PDU (Protocol Data Units) to a subscriber-service interface. The term ONT may typically indicate a single subscriber device, e.g. in a home, and the term ONU may indicate a device that could be provided with additional functionality.

However, the term ONT will hereinafter be used as a generic term in this disclosure and in the appended claims, and will refer to any of an ONU or an ONT.

Since faults may occur in a PON, e.g. due to break in an optical fiber or due to a deteriorating or non-functioning OLT or ONT, a PON has to be monitored, and failures detected and located.

The optical fibers and the optical components of the PON may be characterized e.g. by the use of Optical Time Domain Reflectometry, OTDR. When characteristics of an optical fiber are determined using a conventional OTDR, a series of optical pulses are injected into the fiber. The optical pulses, i.e. an OTDR signal, travels through the fiber, and the OTDR signal is reflected and received, e.g. by the device that injected the optical pulse into the fiber. The amplitude of the reflected, or backscattered, OTDR signal is measured, and may be used e.g. for estimating the length and the attenuation of the fiber, or for locating faults, e.g. a break in the fiber.

A monitoring of a passive optical network using OTM (Optical Transceiver Monitoring) and the above-described OTDR, with a detection and localization of faults with high sensitivity and without requiring upgrading of the ONT, is described e.g. in Urban et. al: "WDM-PON Fiber-Fault Automatic Detection and Localization with 1 dB Event Sensitivity in Drop Links" Conference paper, National Fiber Optic Engineers Conference (NFOEC), Mar. 4, 2012.

The OTDR may provide an accurate localization of a failure in a point-to-point link. However, the dynamic range of OTDR is limited to around 40 dB, and misinterpretations may arise when one of the drop links after a Remote Node with a high split ratio is faulty, since the received backscattered signal is a superposition of the optical power returning from all drop links.

In order to provide a localization of faults in a point-to-multipoint link, the OTDR may e.g. be assisted by a reflective component installed in each drop link, wherein a decrease of the reflection peak in the reflectogram will point out the faulty drop link. However, an introduction of a new component in an ONT will increase the complexity and the costs, e.g. since the equipment is located at customer premises.

Thus, it is desirable to enable an improved monitoring of a passive optical network, also of a point-to-multipoint link with a high split ratio, in order to detect and locate faults in an optical fibre, in an OLT at the Central Office, or in an ONT at customer premises, in a short time frame and in a cost-efficient way.

SUMMARY

It is an object of exemplary embodiments of the invention to address at least some of the issues outlined above, and this object and others are achieved by the method and the device according to the appended independent claims, and by the embodiments according to the dependent claims.

A first exemplary embodiment provides a method of monitoring a Passive Optical Network, PON, which comprises an Optical Line Termination, OLT, connected to one or more Optical Network Terminals, ONT, over an Optical Distribution Network, ODN. The method comprises:

monitoring optical power received by at least one ONT from the OLT, and optical power received by the OLT from each of said at least one ONT;

measuring one or more transceiver parameters of the OLT and an ONT, when the optical power received by the ONT and/or by the OLT violates a defined threshold for received optical power, and performing Optical Frequency Domain Reflectometry, OFDR, for locating a fault in the ODN.

It may further be determined that the ONT and/or the OLT is faulty, if a measured transceiver parameter violates a defined threshold for the parameter, and the determining may comprise evaluating the function of the ONT and/or the OLT, based on the violation of the threshold.

The transceiver parameters may comprise one or more of temperature, voltage, laser bias current and transmitted optical power, and the OFDR may be coherent or incoherent.

The OFDR may use at least two different wavelengths for analysing an optical point-to-multipoint link of the PON.

The method may be performed by a monitoring device connected to a Central Office.

A second exemplary embodiment provides a monitoring device for a PON, the monitoring device comprising an OFDR-device and a processing circuitry. The processing circuitry is configured to:

monitor optical power received by at least one ONT from the OLT, and optical power received by the OLT from each of said at least one ONT;

measure one or more transceiver parameters of the OLT and an ONT, when the optical power received by the ONT and/or by the OLT violates a defined threshold for received optical power, and perform OFDR-analysis, using the OFDR-device, for locating a fault in the ODN.

The processing circuitry may be configured to determine if the ONT and/or the OLT is faulty, if a measured transceiver parameter violates a defined threshold for the measured parameter.

The OFDR-device may be adapted to analyse an optical point-to-multipoint link of the PON, by providing at least two different wavelengths.

The OFDR-device may be further arranged to be tuneable by comprising a tuneable laser or an External Wavelength Adaption Module, EWAM, and may comprise a coherent or an incoherent receiver.

The monitoring device may be connectable to a Central Office, and the processing circuitry may comprise an Access Plant Manager, APM.

It is an advantage with exemplary embodiments that a larger dynamic range and higher resolution can be accomplished by the use of OFDR, as compared to monitoring using OTDR. Exemplary embodiments are applicable also to a point-to-multipoint link, which may comprise a passive RN with a high-split ratio. Further, no additional components are required at the customer premises.

BRIEF DESCRIPTION OF THE DRAWINGS

Exemplary embodiments will now be described in more detail, and with reference to the accompanying drawings, in which.

DETAILED DESCRIPTION

Figure 1:
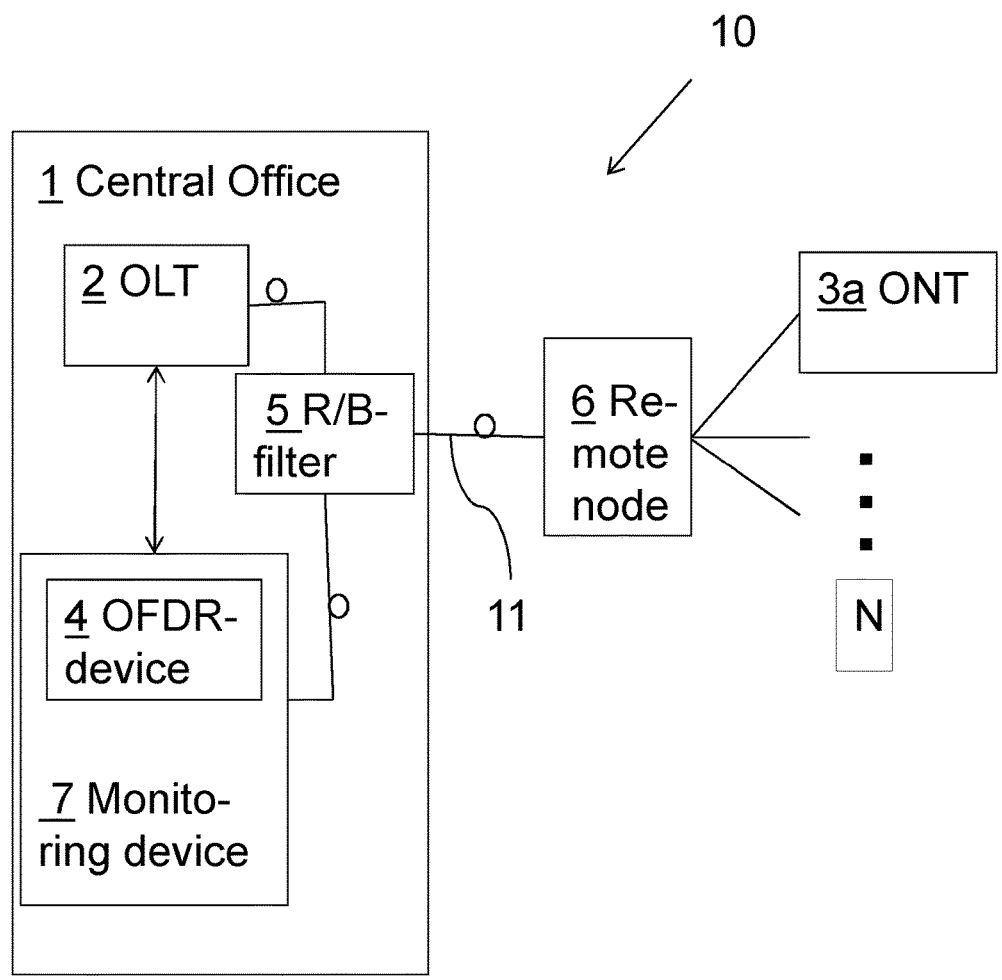
FIG. 1 schematically illustrates an exemplary architecture for monitoring a PON, according to an exemplary embodiment.

In the following description, different exemplary embodiments of the invention will be described in more detail, with reference to accompanying drawings. For the purpose of explanation and not limitation, specific details are set forth, such as particular scenarios and techniques in order to provide a thorough understanding.

Moreover, it is apparent that the exemplary methods and devices described below may be implemented, at least partly, by the use of software functioning in conjunction with a programmed microprocessor or general purpose computer, and/or using an application specific integrated circuit (ASIC). Further, while the embodiments of the invention are primarily described in the form of methods and devices, the embodiments may also, at least partly, be implemented as a computer program product or in a system comprising a computer processor and a memory coupled to the processor, wherein the memory is encoded with one or more programs that may perform the functions disclosed herein.

A monitoring of transceiver parameters in a PON is described e.g. in the ITU-T Recommendation G.984.2, Amendment 2, which defines a standardized Optical Line Supervision, OLS, relating to capabilities for measuring and reporting the state of an optical link in a G-PON (Gigabit Passive Optical Network), and describes physical layer-measurements for supporting optical line supervision of a PON. The optical line supervision may be used e.g. for normal status monitoring, for degradation detection in order to find potential faults before they become service-affecting, and for fault management in order to detect, localize and evaluate faults. The optical line supervision described in the above-mentioned ITU-T Recommendation G.984.2, Amendment 2, involves the monitoring of one or more of the following transceiver parameters for an OLT and an ONT: Transceiver temperature, transceiver voltage, laser bias current, and received and transmitted optical power.

A characterization of optical fibers may be performed using Optical Frequency Domain Reflectometry, OFDR, instead of the above-described Optical Time Domain Reflectometry, OTDR. In incoherent OFDR, a frequency-modulated optical test signal is transmitted through an optical fiber, and a reflected and backscattered optical signal is detected and analysed as a function of the modulation frequency. In coherent OFDR, the frequency-modulated optical test signal is split into two paths, one of which is transmitted through the optical fiber, and the other is used as a reference signal. The reflected and backscattered test signal interferes coherently with the reference signal in a coupler, and the resulting interference signal is detected and analysed. The principal wavelength of an OFDR is typically 1600 nm-1675 nm, and the wavelength may be tunable.

Exemplary embodiments of this invention combine transceiver parameter monitoring and transceiver parameter measurements with an analysis of the ODN using Optical Frequency Domain Reflectometry, OFDR, in order to detect, localize and measure the magnitude of a fault occurring in the transceivers and in the optical fibers of a PON. The transceiver parameter monitoring and transceiver parameter measurements may be based e.g. on the above-described standardized Optical Line Supervision, OLS, for a G-PON.

The OFDR-technique typically has a dynamic range of 80 dB, as compared to a dynamic range of around 40 dB for the OTDR-technique. Further, the signal is able to carry information regarding phase and frequency, and not only the amplitude information that is available in OTDR. Thus, the OFDR will result in a higher sensitivity with an increased signal-to-noise ratio, higher resolution and a higher dynamic range.

Exemplary embodiments may be applicable to both Wavelength Domain Multiplexing, WDM-PON and a Time Domain Multiplexing, TDM-PON, and to a PON with a high split ratio and a passive Remote Node. Further, no upgrade of the ODN is required.

According to an exemplary embodiment, the monitoring and measuring of transceiver parameters is based on the Optical Line Supervision, OLS, defined in the above-mentioned ITU-T Recommendation G.984.2, Amendment 2. Thus, this exemplary embodiment of the invention relies on a concatenated use of OFDR and OLS in order to detect, locate, and analyse faults in the optical fibers of the ODN, in the customer equipment, such as the ONTs, and in the central office equipment, such as an OLT.

According to an exemplary embodiment of the method, the PON is monitored by a monitoring of optical power received by an ONT of the PON, and of optical power received by an OLT from each ONT. When a measured value of the received optical power violates a threshold value, i.e. the value of the received optical power is not within a defined range, this violation could be caused by a fault in the ONT or in the OLT, or in both. However, the violation could also be caused by a faulty ODN, i.e. a fiber fault or break, or by both a fiber fault and a fault in the ONT and/or in the OLT. For this reason, an OFDR-analysis of the ODN (the optical fibers) is performed in order to locate a fault in the ODN, combined with a transceiver analysis of the ONT and the OLT.

The transceiver analysis of the ONT and the OLT comprises measuring one or more transceiver parameter, e.g. the temperature, the voltage, the laser bias current or the transmitted optical power. If a measured transceiver parameter violates a threshold value, i.e. the measured value of the transceiver parameter is not within a defined range, the function of the corresponding transceiver (OLT or ONT) is evaluated further, based e.g. on the magnitude of the violation of the threshold, and of the type of parameter that is violating the threshold.

FIG. 1 shows a generic tree-architecture for monitoring and supervising a PON 10, according to an exemplary embodiment. However, other types of architectures are also possible, such as e.g. a ring-, a single star- or a double star-architecture. The figure illustrates a central office, CO, 1 of an operator, the CO comprising an OLT 2 connected to a filter 5 and to a remote node, RN, 6 over the optical fibers of an ODN 11. The remote node is connected to a number, N, of ONTs, 3a, 3b . . . 3N, and the remote node splits the signal into the required number, N, of signals. As an example, the distance between the Central Office and the Remote node may be around 20 km, and the distance between the Remote Node and each ONT may be 1, 2 or 5 km. However, other distances are possible.

The central office 1 is provided with a monitoring device 7, which is connected to the OLT, and which comprises an OFDR-device 4 for performing OFDR analysis of the ODN. The monitoring device also comprises appropriate processing circuitry (not illustrated in this figure), and this processing circuitry may e.g. include a so-called Access Plant Manager (APM), which is a software package product that is capable of controlling the monitoring of the PON, and the processing of received information.

Figure 2:
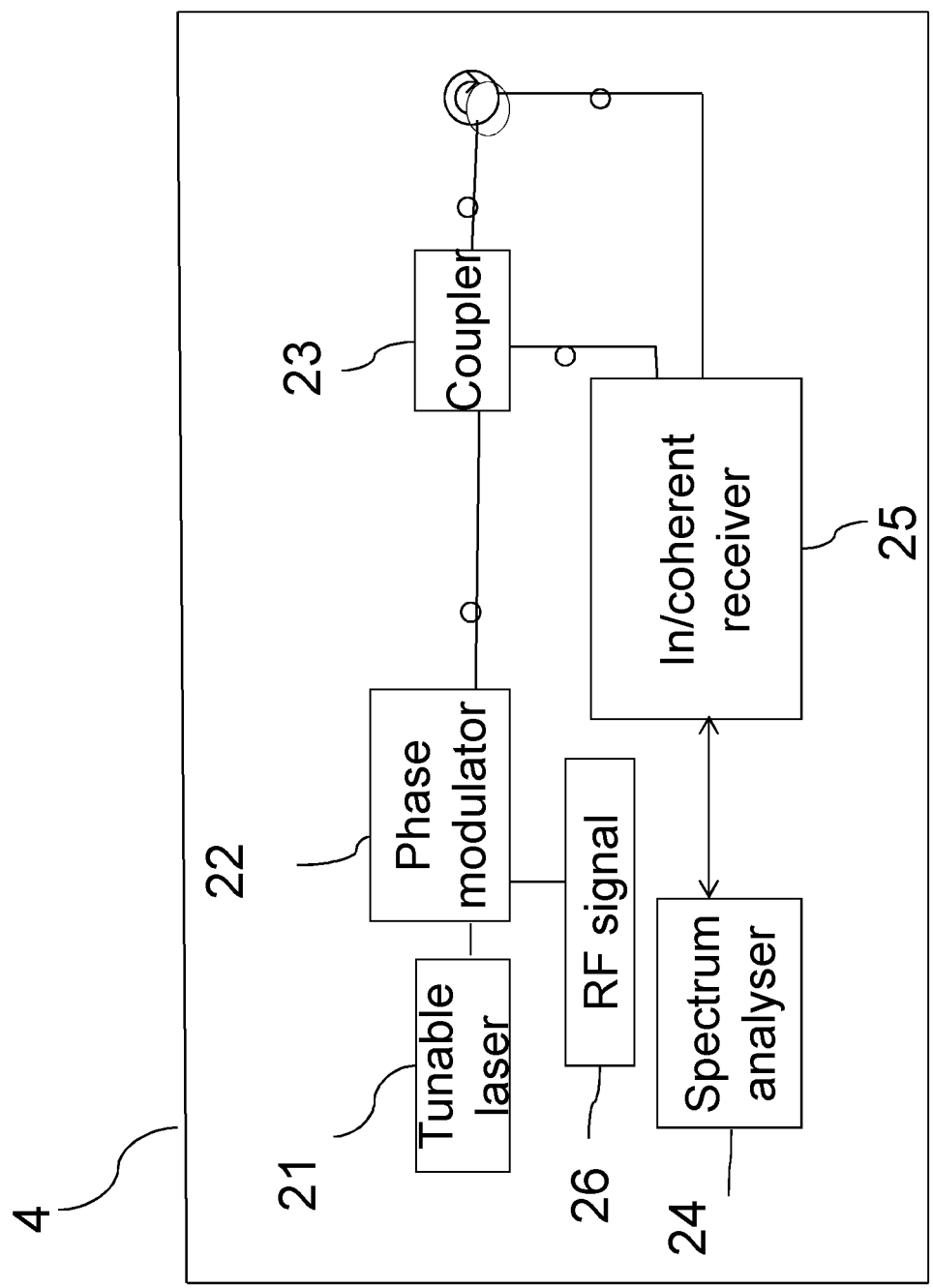
FIG. 2 schematically illustrates an exemplary configuration of an Optical Frequency Domain Reflectometer.

FIG. 2 schematically illustrates an exemplary tuneable OFDR-device 4, comprising a tuneable laser 21, which is connected to a phase- (or frequency-) modulator 22 and a coupler 23. The modulator is also connected to a RF- (radio frequency) signal module 26 that provides an electrical signal for the optical modulation. A reflected signal is received by the receiver 25, and analysed in the spectrum analyser 24. The receiver is typically a coherent receiver 25, i.e. the reflected signal interferes coherently with a reference signal in the coupler. However, in case of long distance-measurements, the received reflected signal could alternatively be detected incoherently, since the measurement distance is limited by the coherence length of a tuneable laser.

In another exemplary tuneable OFDR-device (not illustrated in FIG. 2), the tuneability is accomplished by an external wavelength adaptation module, EWAM, instead of by a tuneable laser.

Figure 3:
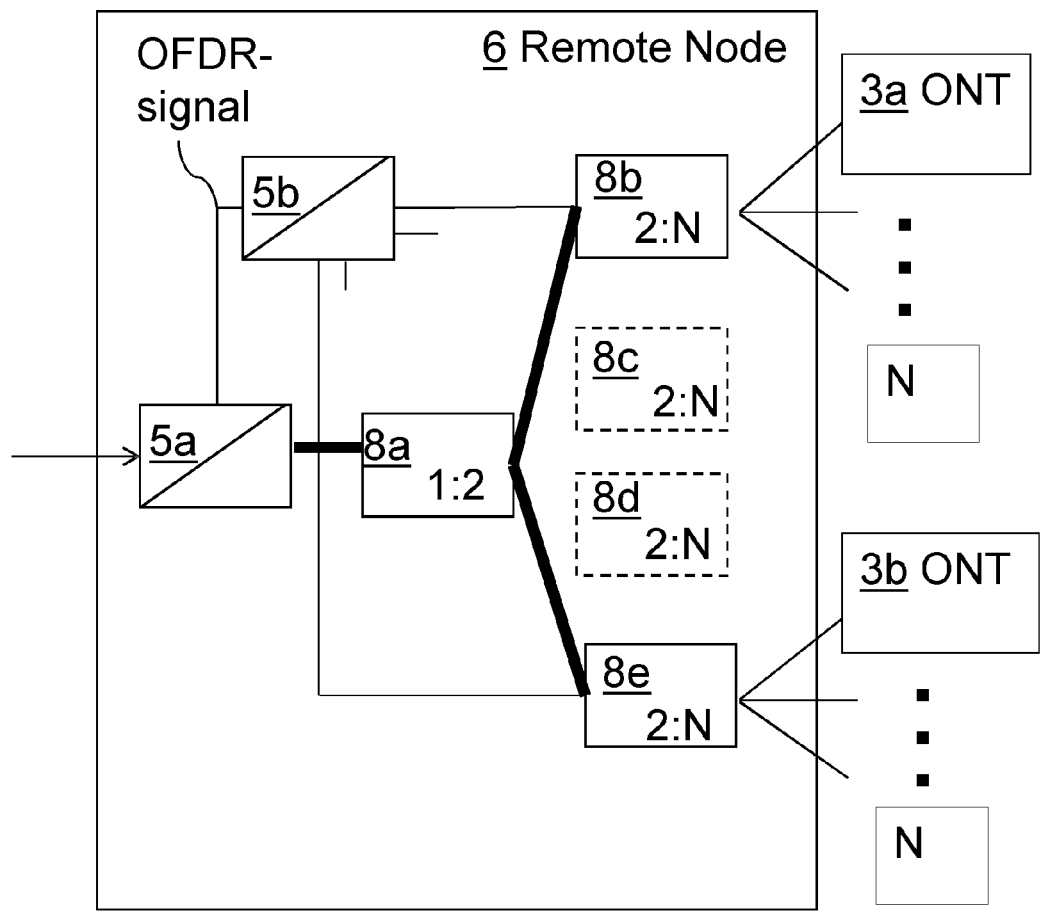
FIG. 3 schematically illustrates an exemplary Remote Node with a high split ratio.

FIG. 3 illustrates a remote node 6 with a high split ratio, i.e. typically higher than 1:32, and the remote node is connected to a plurality of ONTs 3a, 3b. The remote node 6 is further connectable to an OLT 1 of a central office 2 (not illustrated in the figure), for receiving a data signal. Since the central office, according to an exemplary embodiment of this invention, is provided with an OFDR-device 4, the remote node 6 is also adapted to receive an OFDR-signal for the OFDR-analysis of the ODN, and is provided with suitable R/B-filters 5a and 5b in order to distinguish the two or more wavelengths to be used in the OFDR-analysis. In order to perform OFDR-analysis of a PON comprising a remote node connected to a large number of ONTs, the OFDR-device may be tuneable in order to provide a large number of different wavelengths.

The high split ratio of the illustrated remote node is accomplished by two splitter stages, wherein the first splitter stage comprises one splitter 8a with a split ratio of 1:2 (or 1:4), and the second splitter stage comprises four splitters 8b, 8c, 8d and 8e, each having a split ratio of 2:N, and being connected both to the output of the first stage-splitter 8a and to the output of the filter 5b. The splitters 8c and 8d in the second splitter stage are, for the sake of simplicity, only indicated by dashed lines, and they are not connected to any ONTs in the figure. However, if all four second stage-splitters would be connected to a number of ONTs, the first stage-splitter 8a must have a split ratio of 1:4, and if number N is e.g. equal to 32, the remote node 6 would have a split ratio of 1:128.

Figure 4:
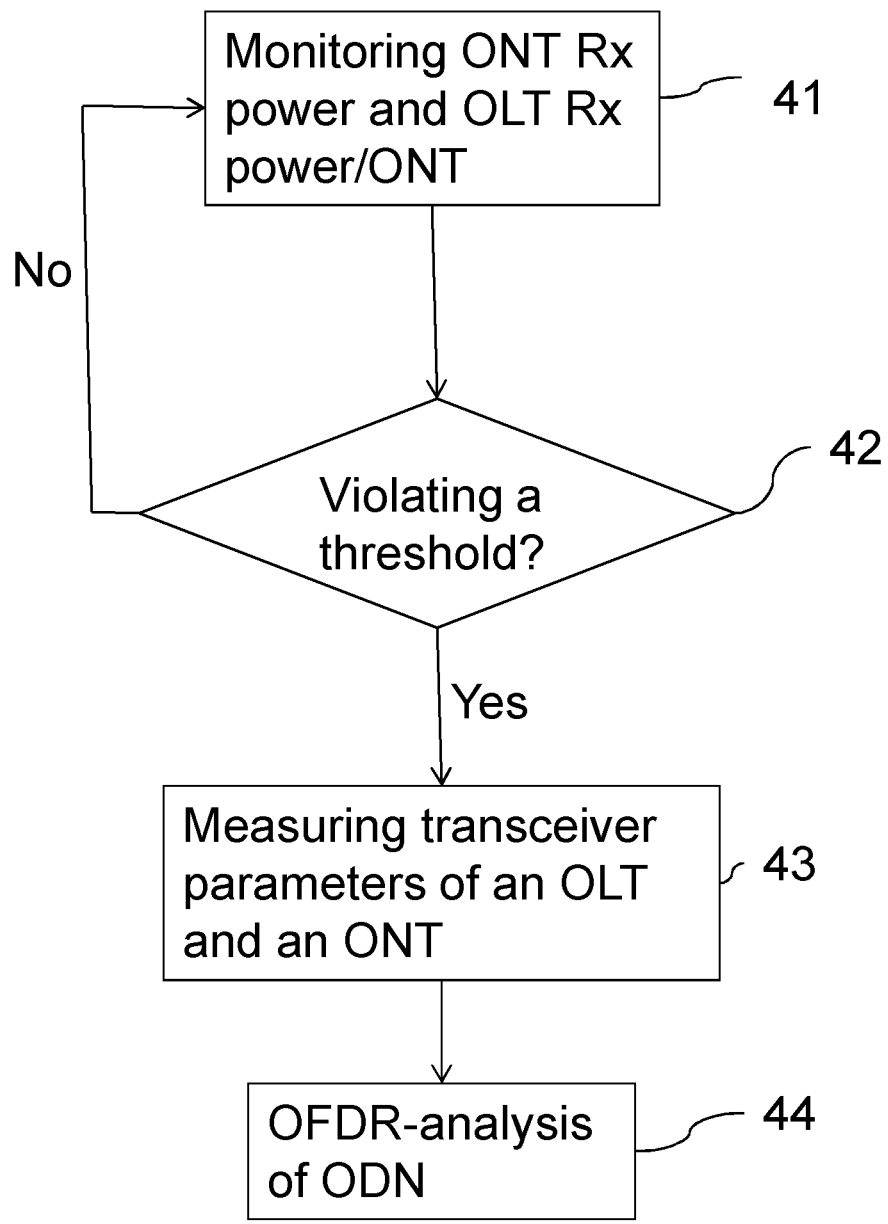
FIG. 4 and FIG. 5 are exemplary flow diagrams schematically illustrating the monitoring of a PON, comprising an OFDR-analysis.

FIG. 4 is a flow diagram schematically illustrating a method of monitoring a PON, according to exemplary embodiments of the invention. In step 41, optical power received by at least one ONT from an OLT is measured, and also optical power received by the OLT from each of said at least one ONT, until it is determined, in step 42, that a measured optical power-value received by the monitored OLT and/or by a monitored ONT is violating a threshold, i.e. is not within a defined range. When this happens, one or more transceiver parameters are measured for the OLT and for the ONT, in step 43, and an OFDR-analysis of the ODN is performed, in step 44, in order to locate a fault in an optical fiber of the ODN.

According to an exemplary embodiment, said method of monitoring a PON is performed by a monitoring device connected to a central office, wherein the monitoring device comprises an OFDR-device.

According to a further embodiment, in a monitoring of a point-to-multipoint link of the PON, the OFDR-device uses at least two different wavelengths.

According to a further exemplary embodiment, the transceiver parameters comprise the temperature, the voltage, the laser bias current, and the transmitted optical power of a transceiver, i.e. an OLT in the central office and an ONT located at customer premises.

Figure 5:
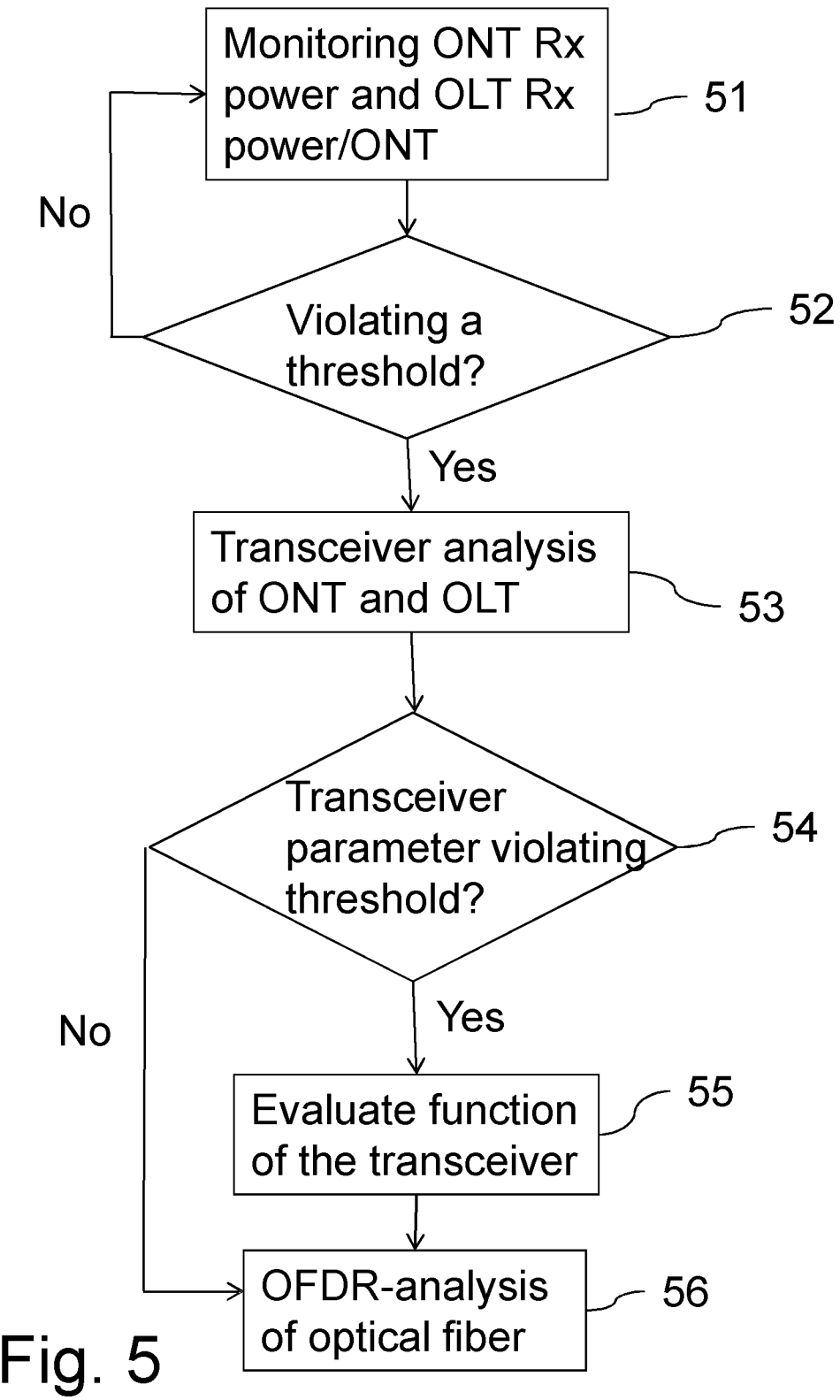

FIG. 5 is a flow diagram schematically illustrating a further exemplary embodiment for monitoring a PON. In step 51, optical power received by at least one ONT from an OLT is measured, and also optical power received by the OLT from each of said at least one ONT, until it is determined, in step 52, that a measured optical power-value received by the monitored OLT and/or by a monitored ONT is violating a threshold, i.e. is not within a defined range. When this happens, one or more transceiver parameters are measured for the OLT and for the ONT, in step 53. If it is determined, in step 54, that a value of any of the measured parameters violates a threshold, i.e. is not within a defined range, the function of the corresponding transceiver is evaluated in step 55, i.e. the ONT and/or the OLT. The evaluation is based e.g. on the magnitude of the violation of the threshold and of the parameter type. This evaluation may also involve additional parameter measurements. Next, in step 56, an OFDR-analysis of the ODN is performed, in order to locate a fault in an optical fiber of the ODN.

However, if it was determined in step 54 that none of the measured transceiver parameters violated the threshold, the OFDR-analysis of the ODN is performed, in step 56, in order to locate a fault in an optical fiber of the ODN, without any preceding evaluation of the function of the transceivers.

Figure 6A:
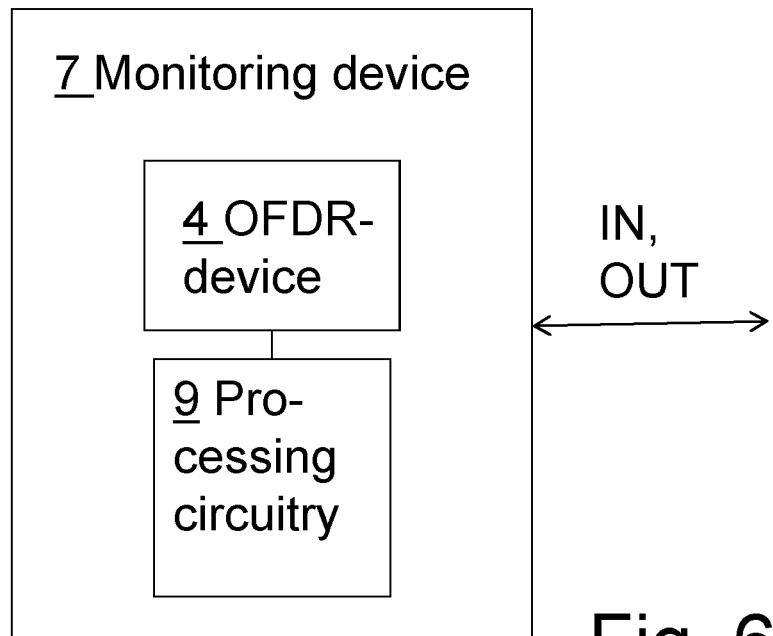
FIGS. 6a and 6b schematically illustrates an exemplary monitoring device for a PON, and an exemplary processing circuitry, which comprises a computer program and a computer program product.

FIG. 6a illustrates schematically a monitoring device 7 according to an exemplary embodiment of the invention, wherein the monitoring device is arranged to monitor a PON, and comprises an OFDR-device 4 and appropriate processing circuitry 9. The processing circuitry 9 is configured to measure optical power received by at least one ONT from an OLT of the PON, and optical power received by the OLT from each of said at least one ONT. The processing circuitry is further configured to measure one or more transceiver parameters of the OLT and the ONT, when the monitored optical power received by the ONT and/or by the OLT violates a defined threshold for received optical power, and to perform an OFDR-analysis of the ODN of the PON, using the OFDR-device 4, in order to locate a fault or a break in an optical fiber of the ODN.

According to a further embodiment, the processing circuitry 9 is configured to determine if the ONT and/or the OLT is faulty, if a measured transceiver parameter violates a defined threshold for the measured parameter.

According to an exemplary embodiment, the monitoring device 7 is connectable to a Central Office 2.

According to a further exemplary embodiment, the OFDR-device 4 of the monitoring device is adapted to analyze an optical point-to-multipoint link by using at least two different wavelengths, and the OFDR-device is arranged to be tunable by comprising a tunable laser 21 or an external wavelength adaption module, EWAM.

According to an exemplary embodiment, the OFDR-device 4 comprises a coherent receiver, which is arranged to receive a coherent optical interference signal, the interference signal including a reflected signal and a reference signal. According to an alternative embodiment, the OFDR-device comprises an incoherent receiver that may be arranged to mix photo-detected electrical signals, before the analysis. This alternative embodiment, using an incoherent receiver, may be used e.g. in case of long distance-measurements, since the measurement distance is limited by the coherence length of a tuneable laser.

The monitoring device 7 further includes suitable receiving and transmitting circuitry, as well as appropriate communication interfaces, (not illustrated in FIG. 6a).

Figure 6B:
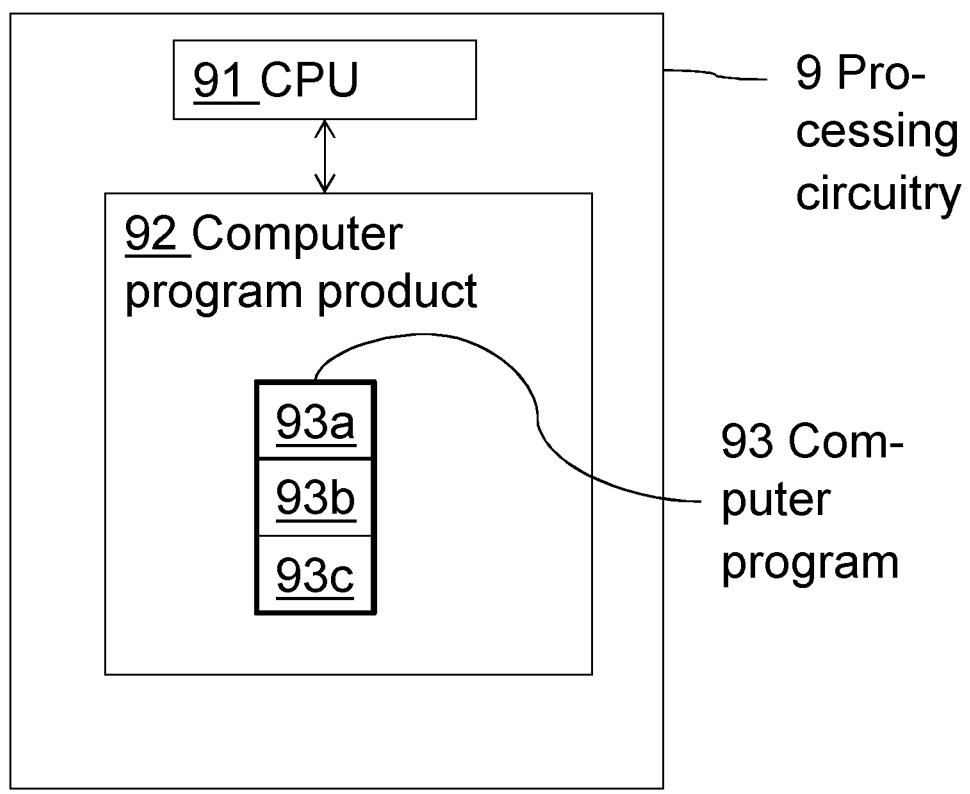

FIG. 6b schematically illustrates the processing circuitry 9, as illustrated in FIG. 6a. The processing circuitry comprises a CPU 91, which may be a single unit or a plurality of units. Furthermore, the processing circuitry comprises at least one computer program product 92, in the form of a non-volatile memory, e.g. an EEPROM (Electrically Erasable Programmable Read-Only Memory), a flash memory or a disk drive. The computer program product 92 comprises a computer program 93 comprising computer readable code which when run on the monitoring device causes the CPU 91 to perform at least the steps illustrated in FIG. 4.

Thus, in the exemplary embodiment illustrated in FIG. 6a, the computer readable code in the computer program 93 comprises a monitoring module 93a, a measuring module 93b, and an OFDR module 93c, which could perform at least the steps of the flow in FIG. 4 for monitoring a PON.

According to a further exemplary embodiment, the processing circuitry 9 of the monitoring device 7 comprises an Access Plant Manager-product (not illustrated in the figure), which is a software-package capable of controlling the monitoring of a PON.

Thus, as mentioned above, it is an advantage with exemplary embodiments that a larger dynamic range and higher resolution can be accomplished by the use of OFDR, as compared to monitoring using OTDR. Exemplary embodiments are applicable also to a point-to-multipoint link, which may comprise a passive RN with a high-split ratio, and does not require any additional components located at the customer premises.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

PON—passive optical network
ODN—optical distribution network
OFDR—optical frequency domain reflectometry
OLS—optical line supervision
ONT—optical network termination
ONU—optical network unit
OTDR—optical time domain reflectometry
R/B-filter—red/blue-filter
RN—remote node
TDM—time domain multiplexing
WDM—wavelength domain multiplexing
T-OFDR—tuneable OFDR
CO—central office
APM—access plant manager
EWAM—external wavelength adaptation module

The invention claimed is:

1. A method of monitoring a Passive Optical Network, PON, comprising an Optical Line Termination, OLT, connected to one or more Optical Network Terminals, ONT, over an Optical Distribution Network, ODN, wherein the method comprises:
   monitoring optical power received by at least one ONT from the OLT, and optical power received by the OLT from each of said at least one ONT;
   measuring one or more transceiver parameters of the OLT and an ONT, based on the optical power received by the ONT and/or by the OLT violating a defined threshold for received optical power, and
   performing Optical Frequency Domain Reflectometry, OFDR, for locating a fault in the ODN.

2. The method according to claim 1, comprising determining if the ONT and/or the OLT is faulty, based on a measured transceiver parameter violating the defined threshold for the parameter.

3. The method according to claim 2, the determining comprising evaluating the function of the ONT and/or the OLT, based on the transceiver parameter violating the threshold.

4. The method according to claim 1, wherein the transceiver parameters comprise one or more of temperature, voltage, laser bias current and transmitted optical power.

5. The method according to claim 1, wherein the OFDR is performed coherently or incoherently.

6. The method according to claim 1, wherein the OFDR uses at least two different wavelengths for analysing an optical point-to-multipoint link of the PON.

7. The method according to claim 1, performed by a monitoring device connected to a Central Office.

8. A computer program product comprising a non-transitory computer readable medium storing computer readable code which, when run on a monitoring device, causes the monitoring device to perform the method according to claim 1.

9. A monitoring device for a Passive Optical Network, PON, the PON comprising an Optical Line Termination, OLT, connected to one or more Optical Network Terminals, ONT, over an Optical Distribution Network, ODN, the monitoring device comprising an Optical Frequency Domain Reflectometry, OFDR-device and a processing circuitry, wherein the processing circuitry is configured to:
   monitor optical power received by at least one ONT from the OLT, and optical power received by the OLT from each of said at least one ONT;
   measure one or more transceiver parameters of the OLT and an ONT, based on the optical power received by the ONT and/or by the OLT violating a defined threshold for received optical power, and
   perform OFDR-analysis, using the OFDR-device, for locating a fault in the ODN.

10. The monitoring device according to claim 9, wherein the processing circuitry is configured to determine if the ONT and/or the OLT is faulty, based on a measured transceiver parameter violating the defined threshold for the measured parameter.

11. The monitoring device according to claim 9 wherein the OFDR-device is adapted to analyse an optical point-to-multipoint link of the PON by providing at least two different wavelengths.

12. The monitoring device according to claim 11, wherein the OFDR-device is arranged to be tuneable by comprising a tuneable laser or an External Wavelength Adaption Module, EWAM.

13. The monitoring device according to claim 9, wherein the OFDR-device comprises a coherent or an incoherent receiver.

14. The monitoring device according to claim 9, connectable to a Central Office.

15. The monitoring device according to claim 9, wherein the processing circuitry comprises an Access Plant Manager, APM.

* * * * *